(12) United States Patent
Yasukawa et al.

(10) Patent No.: US 12,375,928 B2
(45) Date of Patent: Jul. 29, 2025

(54) SYSTEM AND METHOD FOR REMOTELY MANAGING DEVICES (71) Applicant: SORACOM, INC., Setagaya-ku (JP)

(72) Inventors: Kenta Yasukawa, Tokyo (JP); Akio Katayama, Tokyo (JP)

(73) Assignee: SORACOM, INC., Tokyo (JP)

( * ) Notice: Subject to any disclaimer, the term of this patent is extended or adjusted under 35 U.S.C. 154(b) by 966 days.

(21) Appl. No.: 16/628,459

(22) PCT Filed: Jul. 2, 2018

(86) PCT No.: PCT/JP2018/025118
§ 371 (c)(1),
(2) Date: Feb. 10, 2020

(87) PCT Pub. No.: WO2019/009263
PCT Pub. Date: Jan. 10, 2019

(65) Prior Publication Data
US 2023/0199502 A1 Jun. 22, 2023

(30) Foreign Application Priority Data
Jul. 4, 2017 (JP) .................................. 2017-131568

(51) Int. Cl.
H04W 8/20 (2009.01)
H04W 12/40 (2021.01)
(52) U.S. Cl.
CPC ........... H04W 12/40 (2021.01); H04W 8/205 (2013.01)

(58) Field of Classification Search
CPC ...... H04W 12/20; H04W 12/04; H04W 8/205
See application file for complete search history.

(56) References Cited

U.S. PATENT DOCUMENTS

| 7,626,963 | B2 | 12/2009 | Patel et al. |
| 8,594,628 | B1 | 11/2013 | Schroeder et al. |
| 11,102,623 | B2 | 8/2021 | Goldenstein et al. |
| 2009/0183003 | A1 | 7/2009 | Haverinen |

(Continued)

FOREIGN PATENT DOCUMENTS

| CN | 103780618 | 5/2014 |
| CN | 104303484 | 1/2015 |

(Continued)

OTHER PUBLICATIONS

N. Sakai et al., Topics, NTT Docomo, Apr. 1, 2010, vol. 18, No. 1, pp. 64-66, NTT Docomo Technical Journal.

(Continued)

Primary Examiner — Barry W Taylor
(74) Attorney, Agent, or Firm — COZEN O'CONNOR (57) ABSTRACT A method for remotely managing a device involving receiving an initial setting request including a device ID of a device together with an identification number for connecting to a cellular network or a corresponding ID via the cellular network from the device on which the identification number is stored, obtaining a customer ID corresponding to the identification number based on the identification number or the corresponding ID, generating a credential for the device using the customer ID and the device ID, and transmitting initial setting information including the credential or corresponding authentication information to the device.

16 Claims, 4 Drawing Sheets

(56) References Cited

U.S. PATENT DOCUMENTS

| | | | |
|---|---|---|---|
| 2011/0128911 A1 | 6/2011 | Shaheen | |
| 2014/0304323 A1* | 10/2014 | Alnas | H04W 4/50 709/203 |
| 2015/0359026 A1* | 12/2015 | Iwai | H04W 8/265 370/329 |
| 2016/0065556 A1 | 3/2016 | Sasin et al. | |
| 2016/0100362 A1* | 4/2016 | Palanisamy | H04W 72/23 370/311 |
| 2016/0183081 A1* | 6/2016 | Flores Cuadrado | H04M 15/50 455/558 |
| 2016/0234181 A1 | 8/2016 | Bone et al. | |
| 2017/0034644 A1* | 2/2017 | Chennakeshu | H04W 60/04 |
| 2017/0265173 A1* | 9/2017 | Bailey | H04W 8/24 |
| 2017/0374059 A1* | 12/2017 | Ahmavaara | H04L 67/567 |
| 2018/0152541 A1* | 5/2018 | Mathison | H04W 4/70 |
| 2018/0206117 A1* | 7/2018 | Stahl | H04W 12/35 |
| 2019/0036875 A1* | 1/2019 | Jiménez | H04L 61/5014 |
| 2019/0158355 A1* | 5/2019 | Ramisetty | H04L 63/0853 |
| 2021/0235235 A1 | 7/2021 | Goldenstein et al. | |
| 2022/0053332 A1* | 2/2022 | Venkatachalam | H04L 63/0272 |

FOREIGN PATENT DOCUMENTS

| | | |
|---|---|---|
| CN | 105873056 | 8/2016 |
| JP | 2004-227077 | 8/2004 |
| JP | 2006-236000 | 9/2006 |
| JP | 2010-151833 | 7/2010 |
| JP | 2013074606 | 4/2013 |
| JP | 2016-167238 | 9/2016 |
| JP | 2017036732 | 2/2017 |
| JP | 2017059926 | 3/2017 |
| WO | WO 2009/092115 A2 | 7/2009 |
| WO | 2015036789 | 3/2015 |
| WO | 2016074707 | 5/2016 |
| WO | WO 2016/199874 | 12/2016 |
| WO | 2017001022 | 1/2017 |

OTHER PUBLICATIONS

International Search Report issued in corresponding PCT Application No. PCT/JP2018/025118, Sep. 18, 2028.

Written Opinion issued in corresponding PCT Application No. PCT/JP2018/025118, Jan. 7, 2020.

Office Action dated Mar. 29, 2023 issued in Chinese Patent Application No. 201880057232.7.

Office Action dated Nov. 23, 2023, issued in European Patent Application No. 18827503.6.

Notice of Reasons for Refusal, Japanese Patent Application No. 20021-135106, dated Jan. 24, 2024.

* cited by examiner

| LWM2M Access control | | | | | |
|---|---|---|---|---|---|
| Device | | | | | |
| Instance 0 | | | | | |
| Manufacturer | /3/0/0 | Read | Write | Execute | Observe | Unobserve | Leshan Demo Device |
| Model Number | /3/0/1 | Read | Write | Execute | Observe | Unobserve | Model 500 |
| Serial Number | /3/0/2 | Read | Write | Execute | Observe | Unobserve | LT-500-000-0001 |
| Firmware Version | /3/0/3 | Read | Write | Execute | Observe | Unobserve | 1.0.0 |
| Reboot | /3/0/4 | Read | Write | Execute | Observe | Unobserve | |
| Factory Reset | /3/0/5 | Read | Write | Execute | Observe | Unobserve | |
| Available Power Sources | /3/0/6 | Read | Write | Execute | Observe | Unobserve | |
| Power Source Voltage | /3/0/7 | Read | Write | Execute | Observe | Unobserve | |
| Power Source Current | /3/0/8 | Read | Write | Execute | Observe | Unobserve | |
| Battery Level | /3/0/9 | Read | Write | Execute | Observe | Unobserve | 11% |
| Memory Free | /3/0/10 | Read | Write | Execute | Observe | Unobserve | 210793KB |
| Error Code | /3/0/11 | Read | Write | Execute | Observe | Unobserve | |
| Reset Error Code | /3/0/12 | Read | Write | Execute | Observe | Unobserve | |
| Current Time | /3/0/13 | Read | Write | Execute | Observe | Unobserve | Jun 21,2017 7:08:27 AM |
| UTC Offset | /3/0/14 | Read | Write | Execute | Observe | Unobserve | +09 |
| Timezone | /3/0/15 | Read | Write | Execute | Observe | Unobserve | Asia/Tokyo |
| Supported Binding and Modes | /3/0/16 | Read | Write | Execute | Observe | Unobserve | U |

600

SYSTEM AND METHOD FOR REMOTELY MANAGING DEVICES

RELATED APPLICATIONS

This is a U.S. National Phase Application under 35 USC 371 of International Application PCT/JP2018/025118 filed on Jul. 2, 2018.

This application claims the priority of Japanese application no. 2017-131568 filed Jul. 4, 2017, the entire content of which is hereby incorporated by reference.

TECHNICAL FIELD

The present invention relates to an apparatus, method, and program for remotely managing a device.

BACKGROUND OF THE INVENTION

With the progress in sensing technology and communication technology, devices connected to a computer network are increasing and the concept of the Internet of Things in which all objects are networked is becoming popular. Hereinafter, a networked device, not limited to a device connected to the Internet, is referred to as an "IoT device."

IoT device can connect to a network to send collected data to a server, storage, and so on, or to receive data from a server. You can update the firmware, install a new software, or receive a command for the existing software. When considering a case where a large number of devices are deployed at remote locations, it is possible to dynamically detect and manage the settings and status of these devices by connecting to a network.

Such a device management is theoretically possible but not easy in practice. In other words, in order to collect and distribute information remotely, a secure connection with the server for management must be established. One way is to provide in advance the same or corresponding authentication information for communication in a predetermined communication manner to both the management server and the device so that, for example, a software that operates when the device is powered on establishes a connection with the management server using the authentication information.

However, this approach requires setting the authentication information for each device before each device is used and this increases for example the man-hours in the manufacturing process, leading to an increase in costs. In 2020, the number of things connected to the Internet is said to be 20 billion or 100 billion, and the cost of initialization will increase as the number of devices increases explosively.

SUMMARY OF THE INVENTION

The present invention has been made in view of such a problem, and an objective of the present invention is to facilitate the initial setting of authentication information to each device in an apparatus, method, and program for remotely managing a plurality of devices.

Solution to Problem

To achieve such an objective, a first aspect of the present invention is a method for remotely managing a device comprising: receiving an initial setting request including a device ID of a device together with an identification number for connecting to a cellular network or a corresponding ID via the cellular network from the device in which the identification number is stored; obtaining a customer ID corresponding to the identification number based on the identification number or the corresponding ID; generating a credential for the device using the customer ID and the device ID; and transmitting initial setting information including the credential or a corresponding authentication information to the device.

A second aspect of the present invention is a method for remotely managing a device, comprising: receiving a device ID of a device sent from the device connected to a gateway in which an identification number for connecting to a cellular network is stored together with the identification number of the gateway or a corresponding ID as an initial connection request via the cellular network; obtaining a customer ID corresponding to the identification number based on the identification number or a corresponding ID; generating a credential for the device using the customer ID and the device ID; and transmitting initial setting information including the credential or corresponding authentication information to the device.

The third aspect of the present invention is characterized in that, in the first or second aspect, the identification number includes an IMSI.

The fourth aspect of the present invention is characterized in that the identification number is stored in a SIM card in any of the first to third aspects.

The fifth aspect of the present invention is characterized in that, in any of the first to fourth aspects, the credential is a credential for connecting to a wired network.

The sixth aspect of the present invention is characterized in that the credential is a credential for connecting to a wireless network in any of the first to fourth aspects.

The seventh aspect of the present invention is characterized in that, in the sixth aspect, the wireless network is a network other than a cellular network that can be connected by the identification number.

The eighth aspect of the present invention is characterized in that in the sixth or seventh aspect, communication in the wireless network uses the LwM2M protocol.

The ninth aspect of the present invention is characterized in that the transmission of the credential is performed via the cellular network in any of the first to eighth aspects.

The tenth aspect of the present invention is characterized in that, in the first or second aspect, the reception and transmission are performed on a communication apparatus for providing a communication in the cellular network, the generation is performed on a management apparatus for managing the device, and the management apparatus is capable of communicating with the communication apparatus outside of the cellular network.

The eleventh aspect of the present invention is characterized in that, in the tenth aspect, the obtaining is performed on the communication apparatus.

The twelfth aspect of the present invention is characterized in that, in the tenth or eleventh aspect, the initial setting information includes connection destination information of the management apparatus.

The thirteenth aspect of the present invention is characterized in that, in the twelfth aspect, the management apparatus includes a first management apparatus and a second management apparatus, the generation is performed on the first management apparatus, and the connection destination information includes a connection destination URL of the second management apparatus.

The fourteenth aspect of the present invention is a program for causing a computer to perform a method for remotely managing a device, the method comprising: receiving an initial setting request including a device ID of a device together with an identification number for connecting to a cellular network or a corresponding ID via the cellular network from the device in which the identification number is stored; obtaining a customer ID corresponding to the identification number based on the identification number or the corresponding ID; generating a credential for the device using the customer ID and the device ID; and transmitting initial setting information including the credential or a corresponding authentication information to the device.

The fifteenth aspect of the present invention is an apparatus for remotely managing a device, which receives an initial setting request including a device ID of a device together with an identification number for connecting to a cellular network or a corresponding ID via the cellular network from the device in which the identification number is stored, obtains a customer ID corresponding to the identification number based on the identification number or the corresponding ID, generates a credential for the device using the customer ID and the device ID, and transmits initial setting information including the credential or corresponding authentication information to the device.

Advantageous Effect of Invention

According to one aspect of the present invention, by generating a credential for a device on the basis of an identification number, such as an IMSI, for connecting to a cellular network already stored in the device to be managed, and providing it to the device, the initial setting required for a secure connection with the management apparatus for managing the device can significantly be made easy.

DESCRIPTION OF EMBODIMENTS

Hereinafter, embodiments of the present invention will be described in detail with reference to the drawings.

First Embodiment

Figure 1:
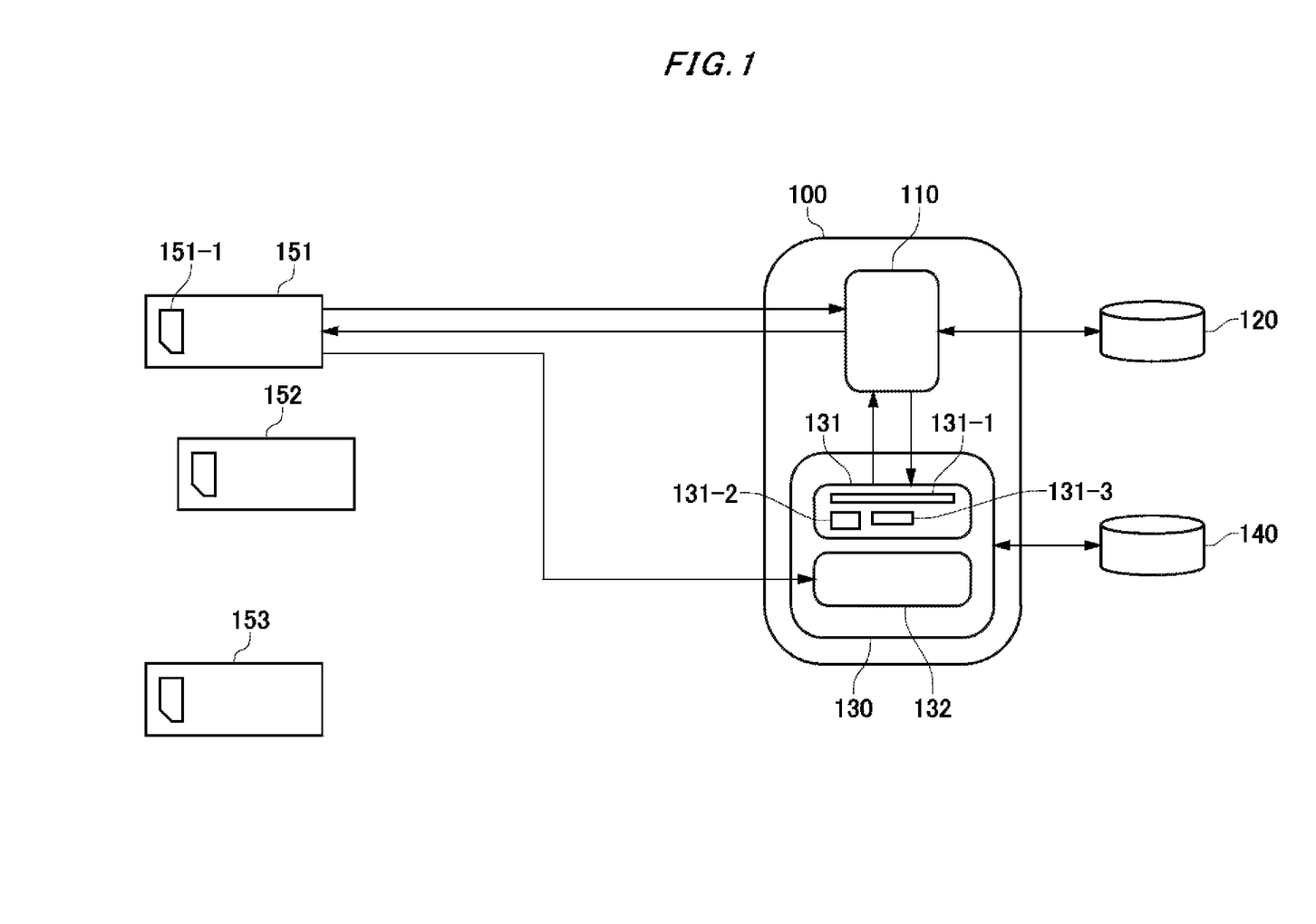
FIG. 1 is a diagram showing a management system according to the first embodiment of the present invention.

FIG. 1 illustrates a management system according to the first embodiment of the present invention. The management system 100 includes a communication apparatus 110 for communicating with a plurality of devices 151, 152, 153 over a cellular network, and a management apparatus 130 that can communicate with the communication apparatus 110 for managing the plurality of devices 151, 152, 153. The number of devices may be one or more, and FIG. 1 shows three examples but the number is not limited to the figure. The device 151 is used as an example below.

The communication apparatus 110 can be a communication apparatus of an MNO (Mobile Network Operator) or a communication apparatus of an MVNO (Mobile Virtual Network Operator) that provides wireless communication services by connecting to the communication infrastructure of an MNO. A SIM card 151-1 provided by the MNO or MVNO is inserted into the device 151 to enable communication with the communication apparatus 110 over a cellular network after verification by an HLR/HSS. In the present embodiment, communication between the device 151 and the communication apparatus 110 is performed in the core network of a cellular network, and communication between the communication apparatus 110 and the management apparatus 130 is performed outside the cellular network.

An MVNE (Mobile Virtual Network Enabler) that provides support services for MVNOs to operate smoothly may exist between an MNO and an MVNO, and the MVNE may connect to the communication infrastructure of the MNO to provide a communication infrastructure for providing wireless communication services. In this situation, the communication apparatus 110 becomes a communication apparatus of the MVNE. Also, the MVNE may provide the SIM card 151-1.

The communication apparatus 110 is capable of communicating with the database 120, and the database 120 stores a correspondence for each SIM card between an identification number, such as an IMSI, or a corresponding ID, and a customer ID, such as a user name, company name, and the like, of the SIM card. Instead of accessing the database 120, the communication apparatus 110 may comprise its own storage apparatus or storage medium (not shown) and store the correspondence therein.

Although described primarily in reference to SIM cards, an identification number such as an IMSI may not only be stored on the physical SIM card 151-1 of the device 151. One or more IMSIs may be stored on a semiconductor chip (also called "eSIM") embedded in the device 151, or may be stored on a software installed in a secure area within a module of the device 151, and there are various manners in which the device 151 can directly or indirectly hold one or more IMSIs. In the present invention, as will be described later, initial setting for management is performed using an identification number for connecting to a cellular network stored in the device 151. An IMSI can realize high security since its reliability is verified at the time of the connection to the cellular network, and subsequent communication is highly kept secret by encryption.

The management apparatus 130 can communicate with the database 140, and the database 140 stores data required for initial setting of the device 151 as described below. Instead of accessing the database 140, the communication apparatus 110 may include its own storage apparatus or storage medium for storage therein. Management apparatus 130, as shown in FIG. 1, can be separated into the first management apparatus 131 for performing initial setting necessary for management, and the second management apparatus 132 for performing management after the initial setting. Below explanation describes this example, but they may be configured on the same apparatus. In that case, transmission and reception performed between the first management apparatus 131 and the second management apparatus 132 is not performed. The same is true when the communication apparatus 110 and the management apparatus 130 are configured on the same apparatus.

The device 151 can be any device with required communication functions and it is sufficient to have an identification number for connecting to a cellular network. It is required that a software written in programming languages such as C, Java (registered trademark), etc. can be executed in order to transmit the result of sensing at the device 151 such as battery level, radio field strength, operating condition, etc. to the management system 100 or to execute a command from the management system 100. An Extension can be made using a different programming language (Ruby, Go, JavaScript (registered trademark), etc.) that wraps C implementation. For example, it can be a device with an operating system such as Linux (registered trademark) or Android (registered trademark). The device 151 can be of limited resources by having the device 151 to hold the minimum or a limited software required for the management apparatus 130 to perform management and letting the management apparatus 130 carry out a number of processes. From this point of view, it is preferable to implement at least part of the management apparatus 130 on a cloud, and more preferably on a public or private cloud. As a specific example, it is conceivable that the LwM2M protocol over the IP protocol is used for device management, and configuring the LwM2M client on the device 151, the LwM2M bootstrap server on the first management apparatus 131, the LwM2M server on the second management apparatus 132.

Each of the devices described herein may be a plurality of mutually accessible devices, not limited to a physically single device. Further, the first management apparatus 131 comprises a communication unit 131-1 such as a communication interface, etc., a processing unit 131-2 such as a processor, a CPU, etc. and a storage unit 131-3 including a storage apparatus or storage medium such as a memory, a hard disk, etc. By executing a program for performing respective processes stored on the storage unit 131-3 or on a storage apparatus or a storage medium accessible from the first management apparatus 131, each function described below can be realized. Also for other devices, their functions can be realized by using a similar hardware. The program may include one or more programs and may be stored on a computer-readable storage medium as a non-transitory program product.

Figure 2:
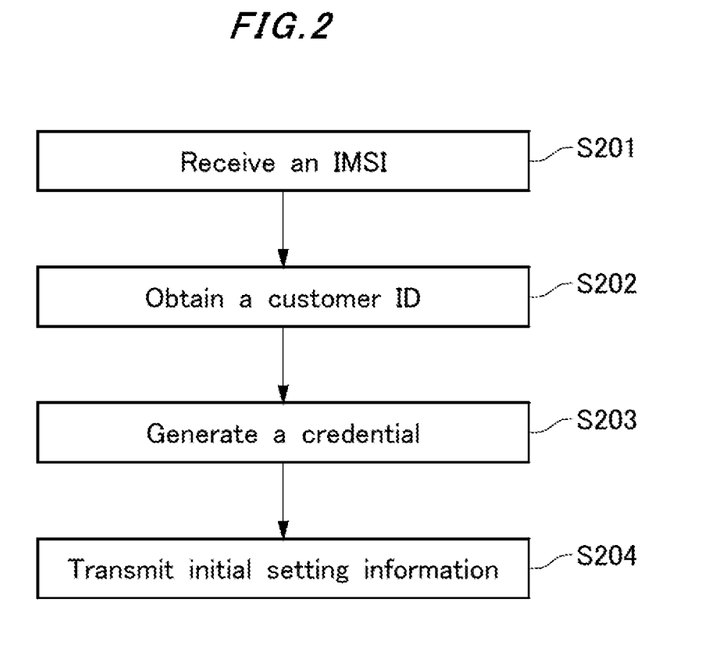
FIG. 2 is a flowchart showing a method according to the first embodiment of the present invention.

FIG. 2 is a flowchart showing a method according to the first embodiment of the present invention. First, from the device 151, the communication apparatus 110 receives, over the cellular network, a device ID, such as the device name (sometimes referred to as the "endpoint") of the device 151, together with an identification number such as an IMSI stored on the SIM card 151-1 or its corresponding ID such as a TEID (S201). As an example, a predetermined software may operate when the device 151 is powered on, and an initial setting request including a device ID may be transmitted for initialization so that the following processes are automatically performed if the device 151 does not have a credential for connecting to the management apparatus 130.

Figure 3:
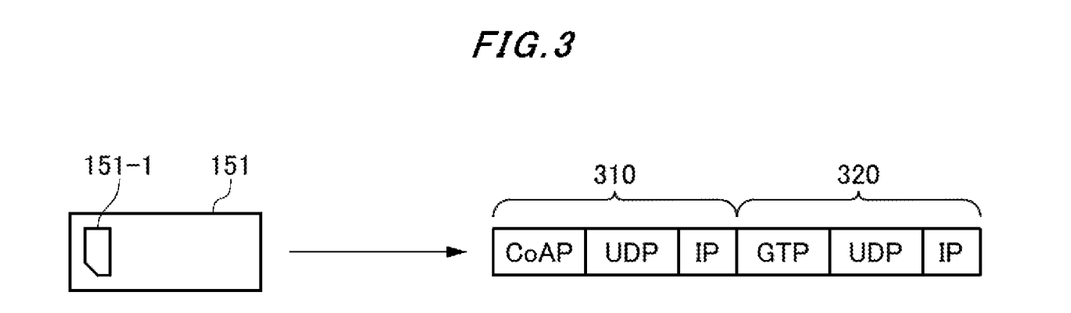
FIG. 3 is a diagram for explaining the initial setting request in a method according to the first embodiment of the present invention.

FIG. 3 is a diagram illustrating an example of an initial setting request transmitted from the device. From the device 151, the first data 310 according to respective protocols of CoAP/UDP/IP is transmitted as an initial setting request, and the second data 320 according to respective protocols of GTP/UDP/IP is added in the cellular network to be received by the communication apparatus 110. In the CoAP area according to the CoAP protocol, "POST/bs" is described together with the endpoint as a bootstrap request according to the LwM2M protocol. The UDP area describes the port number of the software that runs on the device 151. The IP area describes the IP address of the first management apparatus 131 that is the destination and the IP address of the device 151 that is the source.

Since the device 151 has a SIM card inserted and can have a telephone number, it can transmit and receive SMS messages. Messages in accordance with the LwM2M protocol can be exchanged on SMS, and in this case the transport layer that carries a CoAP message becomes SMS instead of UDP/IP.

The communication apparatus 110 then accesses the database 120 as needed to obtain the customer ID associated with the identification number or its corresponding ID (S202). In the example of the data structure shown in FIG. 3, the GTP area of the second data 320 includes a TEID corresponding to an IMSI, which can be used to obtain the customer ID. The communication apparatus 110 passes the obtained customer ID and device ID to the management apparatus 130, and the management apparatus 130 uses these IDs to generate a credential for the device 151 (S203). The generated credential for the device 151, or its corresponding authentication information, is registered in the database 140 or the storage unit 131-3 in association with the customer ID and device ID. In this context, a "credential" is the generic term for a piece of information used to authenticate a user, such as an ID or a password.

Here, although it is described that the communication apparatus 110 performs the acquisition of the customer ID, the initial setting request 310 received by the communication apparatus 110 can be passed to the management apparatus 130 either as is or substantially as is, or the required device ID, IP address, etc. can be passed to the management apparatus 130, and the management apparatus 130 can acquire the customer ID by referring to the correspondence between an identification number such as an IMSI or the corresponding ID and a customer ID such as a user name, a company name, and the like of the SIM card. Other than accessing the database 120 to refer it, the correspondence may be stored in the database 140 and the database 140 may be accessed for reference.

The credential or the corresponding authentication information is transmitted over the cellular network to the device 151 through the communication apparatus 110 (S204). In addition to the credential or the corresponding authentication information, destination information including the IP address or the host name of the second management apparatus 132 to which the device 151 is connected is transmitted to the device 151, and these pieces of information are collectively called initial setting information. The destination information included in the initial setting information may be selectable depending on at least one of a customer ID and a device ID for purposes such as load distribution.

Figure 4:
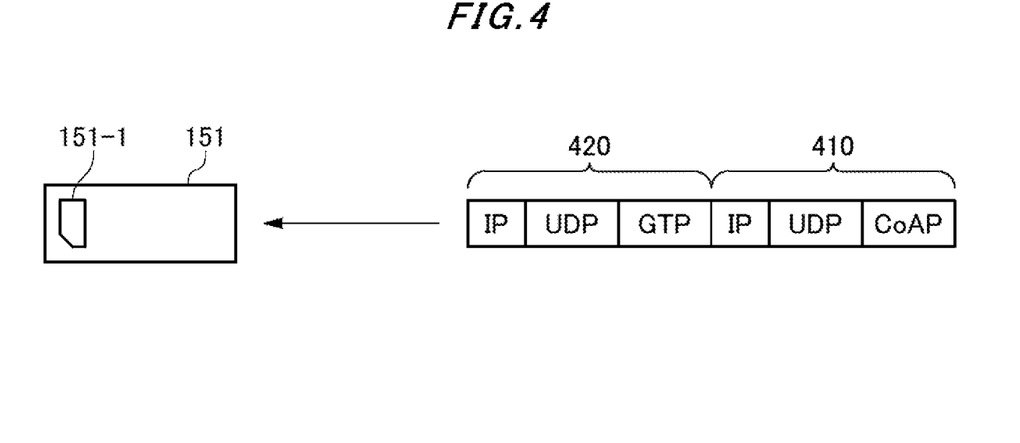
FIG. 4 is a diagram for explaining the initial setting information in a method according to the first embodiment of the present invention.

FIG. 4 is a diagram for explaining exemplary initial setting information transmitted from the management apparatus. From the management apparatus 131, the first data 410 according to respective protocols of CoAP/UDP/IP is transmitted as initial setting information, and the second data 420 according to respective protocols of GTP/UDP/IP is added in the cellular network to be sent to the device 151. In the CoAP area according to the CoAP protocol, in addition to an IP address, the connection destination URL including a protocol and a port number is described as destination information as follows: "coaps://<IP address or host name of the second management apparatus 132>: 5684." In addition, the CoAP area includes a code such as "201" in the case of the LwM2M protocol indicating that the initial setting request has been appropriately processed. In response to receiving this, subsequent connection processing can proceed at the device 151. The UDP area describes the port number of the software that runs on the device 151. The IP area describes the IP address of the destination device 151 and the IP address of the first management apparatus 131 that is the source.

The device 151, upon receiving the initial setting information including the credential or its corresponding authentication information and the destination information, establishes a secure connection with the second management apparatus 132 or the management apparatus 130 using the initial setting information.

In this way, initial setting required for secure connection between the device 151 and the management apparatus 130 or the management system 100 for remote management is greatly facilitated by generating a credential for the device 151 on the basis of an identification number such as an IMSI pre-kitted to the device 151 for connection to a cellular network and providing it ex post facto.

Note that if there is no description of "only" such as in "only based on xx," "only in response to xx," "only when," and so on, it is assumed that additional information may be considered in this specification.

All or part of the management system 100 and databases 120, 140 may be a instance on a cloud or on a public or private cloud. As used herein, the term "cloud" refers to a system in which computing resources such as CPU, memory, storage, and network bandwidth can be dynamically provisioned and provided on a network in response to a demand. For example, the cloud can be used by means of AWS, etc. Also, "public cloud" refers to a cloud that can be used by multiple tenants.

Second Embodiment

Figure 5:
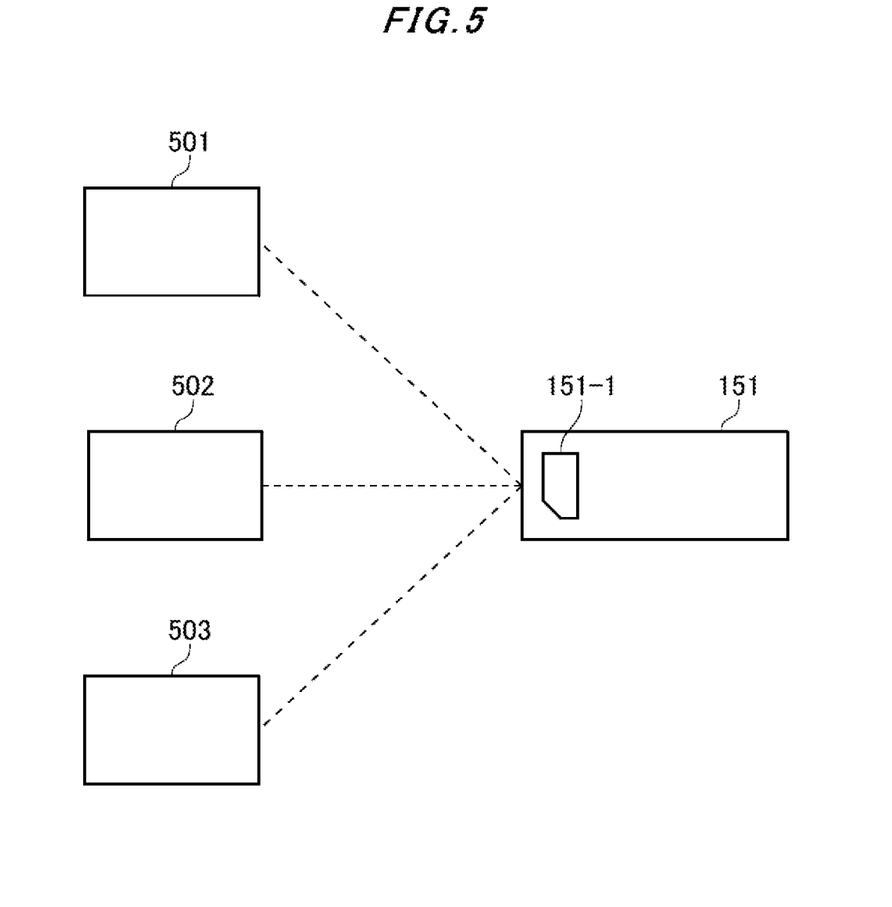
FIG. 5 is a diagram for explaining a managed device according to the second embodiment of the present invention.

In the first embodiment, the device 151 was managed, but in the second embodiment of the present invention, the dependent devices 501, 502, 503 connected to the device 151 is managed. An identification number for connecting to a cellular network is stored in the device 151 and the device 151 functions as a gateway. Here, three devices are shown as an example.

When the device 151 receives the device ID of the dependent device 501 from the dependent device 501, if the data structure illustrated in FIG. 3 is considered, the IP address of the source described in the IP area 310 of the first data is converted to the IP address of the gateway itself, and then transmitted as an initial setting request to the communication apparatus 110. In addition to IP address conversion, the port of the UDP layer may also be converted. It is similar to the first embodiment thereafter. If the device 151 receives initial setting information transmitted to the dependent device 501, it performs reverse conversion of the IP address and passes to dependent device 501 the credential contained in the initial setting information or its corresponding authentication information and the destination information.

Third Embodiment

Figure 6:
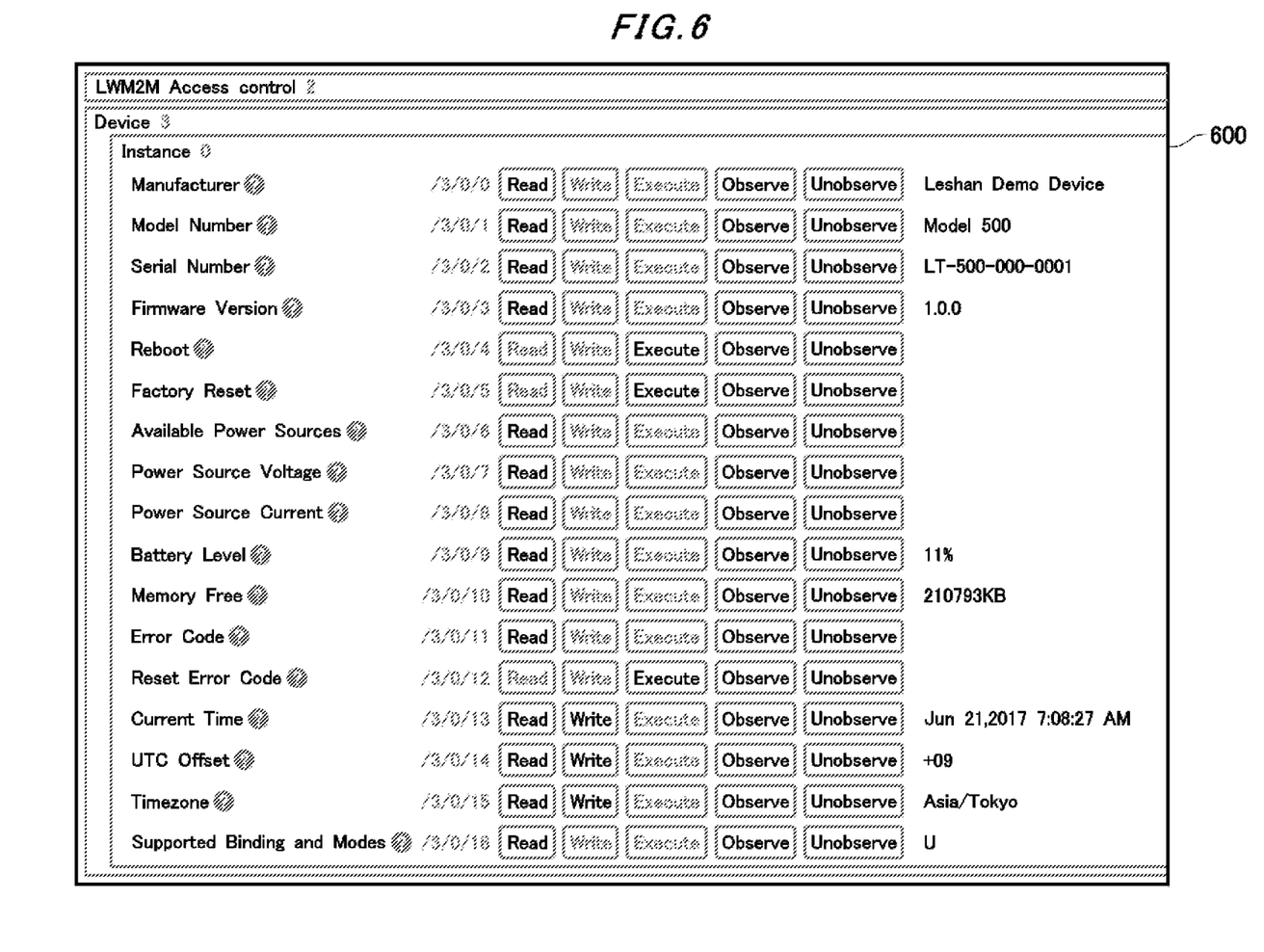
FIG. 6 is a diagram showing a web console according to the third embodiment of the present invention.

Management functions such as checking of information from the device 151 and control to the device 151 performed on the second management apparatus 132 or the management apparatus 130 can be provided externally by providing APIs. A web console can also be provided. FIG. 6 is an example of a web console 600 that can be displayed on a web browser.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for remotely managing a device on which authentication information for remote management of the device is not initially set, the method comprising:
   receiving, at a communication apparatus connected to a cellular network, an initial setting request together with an identification number for connecting to the cellular network or an ID corresponding to the identification number via the cellular network from the device on which the identification number is stored;
   generating, at a first management apparatus different from the communication apparatus, a credential for the device upon the communication apparatus receiving the initial setting request together with the identification number or the ID, wherein the credential is to authenticate the device by a second management apparatus;
   in response to the initial setting request, transmitting to the device, via the cellular network, by the first management apparatus, initial setting information including (i) the credential or authentication information corresponding to the credential and (ii) connection destination information for connecting the device to the second management apparatus via an IP network other than the cellular network; and
   accepting, by the second management apparatus, a connection request from the device based on presentation of the credential by the device.

2. The method according to claim 1, wherein the identification number includes an IMSI.

3. The method according to claim 1, wherein the identification number is stored on a SIM card.

4. The method of claim 1, wherein the credential is a credential for connecting to a wired network.

5. The method of claim 1, wherein transmission of the credential is performed via the cellular network.

6. The method according to claim 1, wherein the connection destination information is connection destination URL of the second management apparatus.

7. The method according to claim 1, wherein the first management apparatus is a LwM2M bootstrap server and the second management apparatus is a LwM2M server.

8. The method according to claim 1, wherein the initial setting information is transmitted by the first management apparatus to the device via the cellular network through the communication apparatus.

9. The method according to claim 1, further comprising determining, at the first management apparatus, the connection destination information in response to the communication apparatus receiving the initial setting request.

10. The method according to claim 1, further comprising determining, at the first management apparatus, the connection destination information in response to the communication apparatus receiving the initial setting request,
    wherein the initial setting information is transmitted by the first management apparatus to the device via the cellular network through the communication apparatus.

11. The method according to claim 1, further comprising providing, by the second management apparatus, a device management function by providing APIs.

12. A system for remotely managing a device on which authentication information for remote management of the device is not initially set, the system comprising:

a communication apparatus connected to a cellular network, a first management apparatus different from the communication apparatus and connected to the communication apparatus, and a second management apparatus that can communicate with the device via a network other than the cellular network; wherein:

the communication apparatus operative to receive an initial setting request together with an identification number for connecting to the cellular network or an ID corresponding to the identification number via the cellular network from the device on which the identification number is stored, the first management apparatus operative to generate a credential for the device upon the communication apparatus receiving the initial setting request together with the identification number or the ID, wherein the credential is to authenticate the device by a second management apparatus, and the first management apparatus operative to, in response to the initial setting request, transmit to the device, via the cellular network, initial setting information including (i) the credential or authentication information corresponding to the credential and (ii) connection destination information for connecting the device to the second management apparatus via an IP network other than the cellular network, and the second management apparatus operative to accept a connection request from the device based on presentation of the credential by the device.

13. The system according to claim 12, wherein the first management apparatus is further operative to transmit the initial setting information to the device via the cellular network through the communication apparatus.

14. The system according to claim 12, wherein the first management apparatus is further operative to determine the connection destination information in response to the communication apparatus receiving the initial setting request.

15. The system according to claim 12, wherein the first management apparatus is further operative to determine the connection destination information in response to the communication apparatus receiving the initial setting request, wherein the initial setting information is transmitted by the first management apparatus to the device via the cellular network through the communication apparatus.

16. The system according to claim 12, wherein the second management apparatus, is further operative to provide a device management function by providing APIs.

* * * * *